United States Patent [19]

Lampe et al.

[11] 4,358,575

[45] Nov. 9, 1982

[54] SELF-BONDING ONE-COMPONENT RTV SILICONE RUBBER COMPOSITIONS

[75] Inventors: Warren R. Lampe, Ballston Lake; Tyrone D. Mitchell, Albany; James A. Cella, Clifton Park, all of N.Y.

[73] Assignee: General Electric Company Silicone Products Business Division, Waterford, N.Y.

[21] Appl. No.: 331,166

[22] Filed: Dec. 16, 1981

[51] Int. Cl.$^3$ ............................................. C08G 77/06
[52] U.S. Cl. ........................................ 528/17; 428/429; 428/447; 428/451; 428/450; 428/452; 528/18; 528/33; 528/34; 528/901; 524/82; 524/84; 524/719; 524/723; 524/730; 524/731; 524/108; 524/111; 524/176; 524/177; 524/261; 524/262; 524/264; 524/265; 524/268; 524/398; 524/588; 524/789; 524/860; 524/865
[58] Field of Search ............... 524/82, 84, 719, 723, 524/730, 731, 108, 111, 176, 177, 261, 262, 264, 265, 268, 398, 588, 789, 860, 865; 428/429, 447, 450, 451, 452; 528/901, 33, 34, 17, 18

[56] References Cited

U.S. PATENT DOCUMENTS

| | | |
|---|---|---|
| 927,787 | 7/1981 | Lampe . |
| 2,938,009 | 5/1960 | Lucas . |
| 3,004,859 | 5/1958 | Lichtenwalner . |
| 3,296,161 | 1/1967 | Kulpa . |
| 3,296,195 | 1/1967 | Goossens . |
| 3,635,743 | 1/1972 | Smith . |
| 4,100,129 | 7/1978 | Beers . |
| 4,176,111 | 11/1979 | Cella . |
| 4,176,112 | 11/1979 | Cella et al. . |
| 4,223,122 | 9/1980 | Cella . |
| 4,238,401 | 12/1980 | Cella et al. . |
| 4,273,698 | 6/1981 | Smith et al. . |

*Primary Examiner*—Melvyn I. Marquis
*Attorney, Agent, or Firm*—E. Philip Koltos; John L. Young; Robert E. Heslin

[57] ABSTRACT

A self-bonding additive for a dimedone functional one-component RTV in which the self-bonding agent is a dialkoxydisilylether functional silane.

64 Claims, No Drawings

SELF-BONDING ONE-COMPONENT RTV SILICONE RUBBER COMPOSITIONS

BACKGROUND OF THE INVENTION

The present invention relates to a one-component RTV silicone rubber composition and more particularly the present invention relates to self-bonding silyl ether functional one-component RTV silicone rubber compositions.

One-component RTV (RTV stands for room temperature vulcanizable) silicone rubber compositions have been known for some time. The earlier compositions comprised as the basic ingredients a silanol terminated polymer which was reacted with an acetoxy-functional silane to produce a linear polymer having acetoxy-functional terminal groups. The resulting polymer would cross-link in the presence of atmospheric moisture to produce a silicone elastomer at room temperature. Complete cure occurred in a rather rapid fashion, that is, in from 24 to 72 hours when there was also present a curing promoter which was preferably a metal salt of a carboxylic acid. The salt was desirably a tin salt of a carboxylic acid. The composition is called a one-component composition since all the ingredients are mixed together in a single package and when it is desired to apply the composition, the seal on the package is broken, the composition is applied to whatever form desired and it crosslinks upon exposure to atmospheric moisture to a silicone elastomer.

There are other types of RTV's with different types of functionality; see, for example, U.S. Pat. No. 4,100,129. It was desirable to discover various types of one-component RTV's with different functionalities so as to have the desired properties in the RTV system. Thus, the alkoxy-functional RTV has advantageous properties in that it is relatively non-corrosive and does not have any objectionable odor contrary to the properties of the acetoxy-functional RTV's. However, the alkoxy-functional RTV's do not cure at a sufficient rate even with various types of curing promoters such as titanium esters.

Accordingly, one attempt to resolve this problem was the discovery of silyl ether-functional RTV's. See for instance, U.S. Pat. Nos. 4,176,111, 4,176,112, 4,223,122, and 4,238,401 which are exemplary of such systems and which disclosures are hereby incorporated by reference. U.S. Pat. No. 4,176,111 disclosed the basic dimedone or silyl ether-functional RTV system. However, the basic system cured at too rapid a rate and accordingly in order to give the composition some work life before curing, it was recommended in the above patent that there be a high carbon alkyl radical attached to the silicon atom to which the silyl ether-functional group was appended. It was found that such a higher alkyl radical on the terminal silicone atoms slowed the cure of the system through stearic hindrance. A still further solution that was proposed was the utilization of an alkoxy group on the silicon atom to which the silyl ether group was appended thereto. While these modifications operated with varying success, it was found that such silyl ether functional compositions suffer from a basic deficiency; that is, they did not have good adhesion to various substrates. It should be noted that other types of functional RTV systems also did not have superior adhesion to substrates. Therefore, there were incorporated into such RTV compositions, various types of self-bonding additives so as to make the composition have superior self-bonding properties to substrates without the use of a primer. Thus, for instance, see the use of the acyloxy, alkoxy-functional silanes of Kulpa U.S. Pat. No. 3,296,161 and Gossens, U.S. Pat. No. 3,296,195 which resulted in superior adhesion of the acetoxy-functional RTV systems to various types of substrates. Also, the enhancement of the self-bonding properties of an alkoxy-functional RTV system by the use of silyl isocyanurate self-bonding additives is disclosed in U.S. Pat. No. 4,100,129. There can also be noted the use of silyl maleates, silyl fumarates, and the like as self-bonding additives in acyloxy-functional and alkoxy-functional RTV's as disclosed in Mitchell et al, U.S. Pat. No. 4,273,698 which is hereby incorporated by reference. However, these self-bonding additives which perform in a superior manner for the the acyloxy functional and alkoxy functional RTV systems, were not found to work as well with the silyl ether functional system. In this respect, it should be noted that the diacyloxy, dialkoxy silane of Kulpa U.S. Pat. No. 3,296,161, was not tested in the silyl ether functional RTV system since it liberates a corrosive acid, that is, acetic acid. Accordingly, for this reason, it would be undesirable in the dimedone or silyl ether-functional RTV system.

Accordingly, it was highly desirable to find a self-bonding additive for dimedone or silyl ether-functional RTV systems.

Accordingly, it is one object of the present invention to provide for a self-bonding additive for a dimedone or silyl ether-functional RTV system.

It is yet an additional object of the present invention to provide a process for forming self-bonding dimedone-functional one-component RTV systems.

It is still an additional object of the present invention to provide a self-bonding dimedone-functional RTV system that has good self-bonding properties to metallic substrates.

These and other objects of the present invention are accomplished by means of the disclosure set forth herein below.

SUMMARY OF THE INVENTION

A self-bonding, one-component RTV silicone rubber composition comprising (A) 100 parts of a silanol terminated diorganopolysiloxane polymer of a viscosity varying from 100 to 1,000,000 centipoise at 25° C. where the organic group is $C_{(1-8)}$ monovalent hydrocarbon radical; (B) from 0.1 to 10 parts by weight of a silyl etherfunctional silane cross-linking agent, and (C) from 0.1 to 5 parts by weight of an adhesion promoter of the formula,

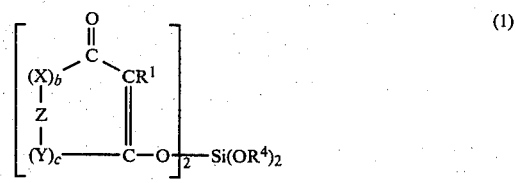

where $R^1$ is selected from the hydrogen, halogen and $C_{(1-13)}$ monovalent organic radicals, X and Y are divalent radicals selected from O, S, and

Z is a divalent $C_{(1-13)}$ organic radical selected from alkylene, cycloalkylene, arylene, and a fused ring structure, b and c are equal to 0 or 1, $R^3$ selected from hydrogen and $C_{(1-13)}$ monovalent hydrocarbon radicals, and $R^4$ is a $C_{(4-8)}$ monovalent hydrocarbon radical. It should be noted monovalent organic radical and monovalent hydrocarbon radical are used interchangeably in the instant case and denote an organic radical which is composed of carbon and hydrogen atoms.

It should be noted that in the adhesion promoter of the present case there are two silyl ether groups and two alkoxy groups. The alkoxy groups must have at least four carbon atoms although possibly one may get good bonding properties where the $R^4$ is three carbon atoms. The much preferred group is where $R^4$ is $C_4$-$C_8$ with $C_4$ to $C_5$ being the most preferred. The most preferred groups are tertiary butoxy and neopentoxy. It also must be appreciated that there is envisioned within the present invention the use of the foregoing adhesion promoter of Formula (1) with linear polymers having silyl ether terminal groups as disclosed in the foregoing dimedone patents mentioned previously and as will be outlined below. It should be noted that when the silanol terminated polymer is mixed with the silyl ether cross-linking agent that most of the reaction product is a linear polymer having one, two, or even three silyl ether terminal groups depending on the cross-linking agent that was utilized. However, not all of the composition is of that structure and this is especially the case when there are other ingredients in the composition such as curing promoters, adhesion promoters, and the like. Accordingly, the composition is disclosed and claimed in two forms, that is, in terms of its ingredients and also in terms of the adhesion promoter with the preferred polymer of the system which polymer will have the desired self-bonding properties. Further all curing properties should not degrade upon the composition being stored for periods of time of one year or more. Accordingly, the composition is disclosed and claimed in terms of the ingredients that produce the composition and also in terms of adhesion promoter with the basic polymer species that result in the most preferred dimedone-functional RTV system. We will now proceed to the description of the invention.

DESCRIPTION OF THE PREFERRED EMBODIMENT

There is accomplished by the present invention a self-bonding one-component RTV silicone rubber composition comprising (A) 100 parts by weight of an organosiloxane consisting essentially of chemically combined units of the formula

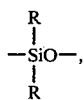

and having terminal alkoxy siloxy units of the formula,

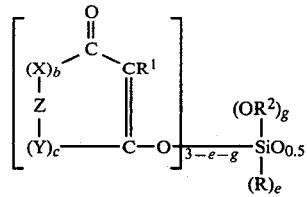

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, g is equal to 1 or 2, and the sum of e+g is equal to 1 or 2; (B) from 0.1 to 5 parts by weight of an adhesion promoter of the formula

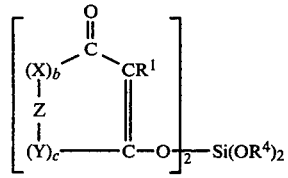

where X, Y, Z $R^1$, b, c are as previously defined and $R^4$ is a $C_{(4-8)}$ monovalent hydrocarbon radical.

It is seen that the self-bonding additive of the present invention contains two alkoxy groups and two dimedone groups. It is envisioned within the present invention that the adhesion promoter must be present in addition to the cross-linking agent and it must contain two dimedone groups as well as two alkoxy groups to give the preferred self-bonding properties to the compositions of the instant case. In the above formulae the radicals R and $R^1$ may be selected from any monovalent hydrocarbon radical of $C_{(1-13)}$ content. Examples of such radicals are alkyl radicals such as methyl, ethyl, propyl, etc.; cycloalkyl radicals such as cyclohexyl, cycloheptyl, etc.; alkenyl radicals such as vinyl, allyl, etc.; mononuclear radicals such as phenyl, methylphenyl, ethylphenyl, etc.; and various other types of monovalent hydrocarbon radicals. Included within the description of such monovalent hydrocarbon radicals are also halogenated monovalent hydrocarbon radicals such as fluoroalkyl radicals of 3 to 8 carbon atoms such as 3-trifluoropropyl.

An example of the disclosure of such compositions in which the crosslinking agent is a dimedone functional cross-linking agent and wherein the polymer contains fluoroalkyl substituent groups is disclosed in U.S. Pat. No. 4,223,122 which is hereby incorporated by reference and which was referred to previously. Proceeding now to the adhesion promoter, this adhesion promoter may be present in a concentration of from 0.1 to 5 parts by weight per 100 parts of the base silanol end-stopped diorganopolysiloxane polymer or per 100 parts by weight of the diorganosilylether terminated polymer. More than 5 parts does not add additional benefits and in addition may detract from the final cured properties of the composition and less than 0.1 parts does not give sufficient self-bonding properties to the composition. Preferably, ther is utilized anywhere from 0.5 to 3 parts by weight of the adhesion promoter.

In the adhesion promoter, X, Y, Z, $R^1$, b and c are as defined previously. As stated above, $R^4$ is a $C_{(4-8)}$ monovalent hydrocarbon radicals. However, most preferably, $R^4$ is alkyl radical of 4-8 carbon atoms, most preferably being tertiary butyl or neopentoxy. Preferred self-bonding additives of Formula (1) are:

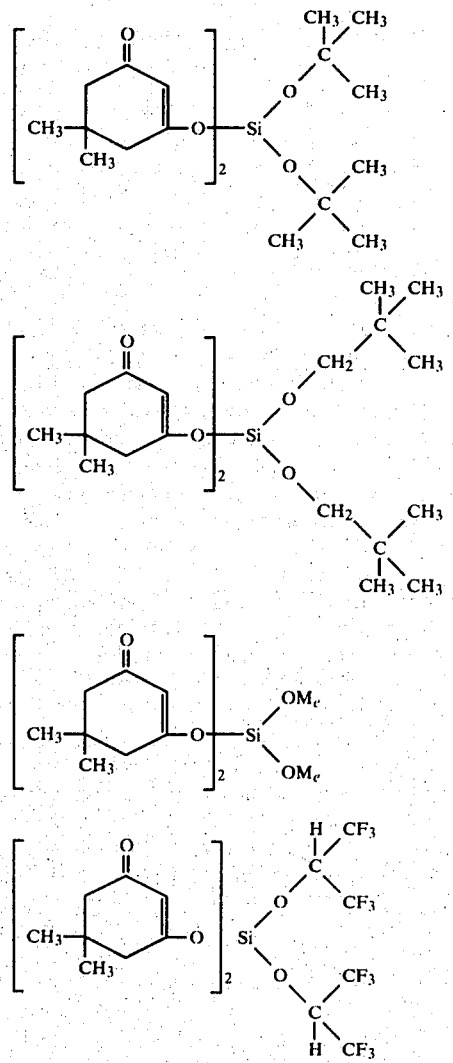

As stated above, it is necessary that the self-bonding additive of the foregoing structure be utilized in the foregoing concentrations in addition to the crosslinking agent and it is desirable that it have two alkoxy groups or hydrocarbonoxy groups as well as two dimedone groups. The alkoxysilylethers of Formula (1) can be made by effecting reaction at substantially anhydrous conditions between an aliphatic alcohol or the formula $$R^2OH \qquad (4)$$

and an halosilane of the formula $$SiQ_4 \qquad (5)$$

where $R^2$ is as previously defined and Q is a halogen radical and a cyclic dicarbonyl compound of the formula

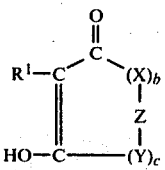

in the presence of a base catalyst where $R^1$, X, Y, Z, b and c are as previously defined.

Reaction between the 1-3 dione and aliphatic alcohol and the halogen silane is effected in the presence of a basic acceptor such as an organic amine for example triethylamine pyridine, etc. Reaction can be facilitated by the use of a non-polar organic solvent such as toluene, benzene, hexane, pentane, chloroform, etc. at temperatures in the range of from 0° C. to 150° C. During the reaction the mixture can be agitated such as by stirring and the mixture can then be filtered of amine salts and the residue stripped of organic solvents to yield the desired product. To obtain the desired self-bonding additive of the instant case, there is, desirably reacted two moles of the alcohol; and two moles of the 1-3-dione per mole of the halogen silane. Instead of reacting all of the ingredients at once, another preferred method of carrying out the reaction is to react the aliphatic alcohol, that is to react 2 moles of the aliphatic alcohol with 1 mole of the halogen silane by itself in the presence of a basic catalyst or a basic acid acceptor, and then after the reaction is complete, add 2 moles of the 1-3-dione per mole of the alkoxy silane, again also in the presence of a basic acid acceptor. Preferably, a solvent may be utilized in either or both reactions as outlined above. Further, the alkoxy chlorosilane may be purified after the first reaction before it is reacted with the 1-3-dione but this is not necessary and adds additional steps to the process. Irrespective of whichever method is applied, there will be obtained the preferred adhesion promoter of the instant case in high yield. It is necessary in obtaining the adhesion promoter of the instant case to use the appropriate stoichiometric amounts of the reactants. If the stoichiometric amounts of the reactant are not utilized then the desired end product adhesion promoter will not be obtained, but rather variations of it with the various amounts of dimedone groups appended to the silicone atoms as well as various amounts of alkoxy groups appended to the silicone atoms. When the proper stoichiometric quantities of the aliphatic alcohol and the dimedone reactant are utilized there is obtained the difunctional dimedone adhesion promoter in high yield; that is yields of 80% or more. For more information as to the process by which such adhesion promoters are prepared, one is referred to the disclosure of U.S. Pat. No. 4,238,401 and U.S. Pat. No. 4,176,112 which disclosure is hereby incorporated by reference. As noted previously, the adhesion promoter is added in addition to the dimedone functional crosslinking agent; it should not be used in place of it. The rest of the composition is well known; that is, a silanol end-stopped polymer is reacted with a silyl ether to give the organo polysiloxane consisting essentially of diorganosiloxy units in the polymer chain having the silyl ether terminal groups. Such process comprises taking 100 parts by weight of a silanol end-stopped polymer of the formula

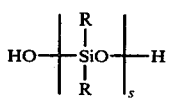
(6)

where R is $C_{(1-8)}$ monovalent organic radical and s varies such that the viscosity of the polymer varies from 100 to 1,000,000 centipoise at 25° C. from 0.1 to 10 parts by weight of a silyl ether crosslinking agent of the formula

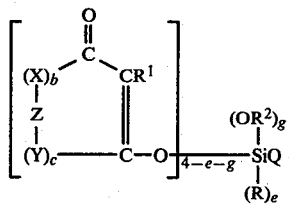

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2.

Examples of preferred crosslinking agents are as follows:

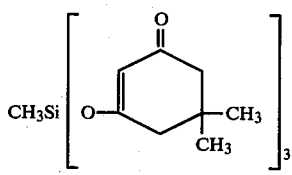

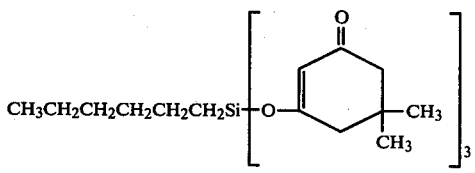

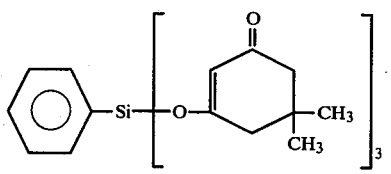

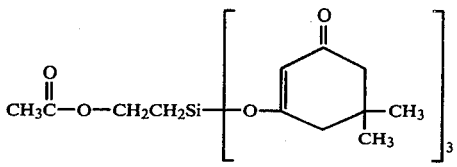

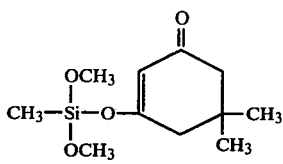

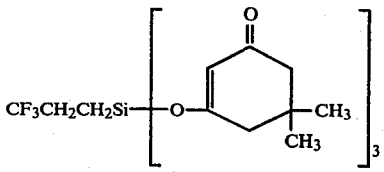

By including the silyl ether silane of Formula (7) and reacting generally 2 moles of it with the silanol end-stopped diorganopolysiloxane polymer of Formula (6) above, it is possible to obtain the polymer described previously; that is, the organopolysiloxane polymers having diorganosiloxy units in the polymer chain with the terminal alkoxysiloxysilyl ether groups described previously. It should be noted that most of the polymer obtained by the reaction of the silanol end-stopped polymer, with the silyl ether Formula (7) will be of the polymer of Formulas (2) and (3). That is most of the polymer specie should be of that formula, but, however, there will be other polymers with different terminal groups formed depending on the other ingredients in the composition that are added in addition to the silyl ether such as the silyl ether or dimedone functional dialkoxy functional adhesion promoter, and the plasticizers that are added to the composition as will be explained below. Further, the composition which desirably has a curing promoter will have some polymers having the curing promoter group in the polymer matrix—the curing promoter to be defined below. Accordingly, the base one-component RTV silicone rubber polymer may be described in the terms of the polymer that forms most of the composition as has been done initially or may be defined in terms of the reactants that form the polymer, that is, the silyl ether crosslinking agent and the silanol end-stopped diorganopolysiloxane polymer reactant that is mixed into the composition. It should be noted that the difference between the two methods in defining the base RTV composition is that when the silyl ether terminated is recited it must be appreciated that not all the polymers in the RTV silicone mixture will have this formula but the most prevalent polymer in the mixture will probably be one of the Formulae (2) and (3) given above. Accordingly, in the one-component RTV silicone rubber composition as defined in terms of 100 parts by weight of the silanol end-stopped polymer of Formula (6) above in combination with 0.1 to 10 parts by weight of the silyl ether crosslinking agent of Formula (7) above, there may be present in the composition from 0.1 to 5 parts by weight of an adhesion promoter of Formula (1) above where the silyl ether crosslinking agent is fully defined in U.S. Pat. No. 4,238,401.

Such a cross linking agent again is obtained by reacting an aliphatic alcohol with an organohalosilane and a cyclic 1-3-dicarbonyl compound in the presence of a base catalyst as defined in the foregoing patent. The details in the process by which these crosslinking agents are obtained is disclosed in U.S. Pat. No. 4,238,401, and accordingly we will not be going into detail here. It has been found that the foregoing silyl ether functional RTV compositions have good self-bonding properties to metallic substrates when the foregoing adhesion promoters are incorporated in the quantities indicated. It should be appreciated that this is especially true with aluminum. It is also postulated that such composition will have good self-bonding properties to various types of wood, plastics, such as acrylics, and polyvinylchloride, and also glass and ceramic surfaces.

There may be also incorporated other ingredients in the composition. One necessary ingredient that must be present is from 0.01 to 10 parts by weight of a curing promoter which is metal salt of a carboxylic acid. Preferably, the metal salt is a tin salt. The tin salt is desirable in the composition if the composition is to have a sufficient cure rate and cure to a complete cure in 24 to 72 hours after being exposed to atmospheric moisture even after prolonged storage. The most preferable tin salt for this purpose is dimethyl tin neodecanoate. It is also preferred to have in this composition from 0.1 to 5 parts by weight of a shelf life stabilizer; that is, it has been found that with such dimedone compositions, that the composition will cure at an appropriate rate and at a rapid rate with complete curing taking place in the presence of tin salt in the first six months of a year after it has been manufactured. However, for periods of time after that the cure slows down and the composition might not cure at all. Accordingly, a shelf life stabilizer is desirable. Thus, there may be incorporated from 0.1 to 5 parts by weight of zirconium octoate as a shelf life stabilizer in the composition. Other shelf life stabilizers are zinc and zirconium salts of carboxylic acids. Such shelf life stabilizers for one-component and two-component RTV compositions are for instance disclosed in Lampe, et al, Ser. No. 927,787, filed on July 25, 1978 which is hereby incorporated by reference. For more details as to shelf-life stabilizers, one is referred to the foregoing Lampe et al disclosure. By having one of the foregoing shelf-life stabilizers in combination with dimethyl tin bis neodecanoate, it is found that the composition has an appropriate shelf-life and will not only cure rapidly but will completely cure at periods of time up to two years after manufacture. It should be noted that in such cases, it is preferred that the dialkyl tin bis-neodecanoate be utilized in combination with the zirconium octoate. If shelf life is not such a big consideration, then other tin salts may be utilized such as dibutyl tin dilaurate and dibutyl tin oxide.

There may also be present various other additives in the composition such as from 10 to 200 parts by weight of filler. More than this amount of filler may be utilized; however, such additional amounts of filler function to increase the viscosity of the composition and may be undesirable in certain applications of the system. The filler may be utilized or may be selected from reinforcing filler and extending fillers. Examples of reinforcing fillers are fumed silica and precipitated silica. If fumed silica or precipitated silica are utilized in the composition, it is preferred they be utilized at a concentration of 10 to 100 parts by weight of the filler. Preferably the fumed silica or precipitated silica is treated with cyclopolysiloxanes and/or silazanes as disclosed in Lucas U.S. Pat. No. 2,938,009, Lichtenwalner, U.S. Pat. No. 3,004,859, and Smith U.S. Pat. No. 3,635,743 so that the filler when incorporated into the composition will enhance the final physical properties of the composition without unduly increasing the uncured viscosity of the composition. There may also be incorporated extending fillers in the composition for enhancing the final cured properties without unduly increasing the viscosity or for various other reasons. Examples of extending fillers that may be utilized are for example: titanium dioxide, zirconium silicate, silicate aerogel, iron oxide, diatomaceous earth, carbon black, glass fibers, polyvinyl chloride, ground quartz, etc.

There may also be present in the composition a plasticizer so that the composition does not have an unduly high viscosity in the uncured state and also if it is desired to have a final cured RTV silicone elastomer with a low Modulus. There should be from 1 to 50 parts by weight of a plasticizer in the composition per 100 parts of the silanol polymer. Preferably, the plasticizer is a linear diorganopolysiloxane polymer of a viscosity varying from 10 to 1,000 centipoise at 25° C. and the organic group is a $C_{(1-8)}$ monovalent hydrocarbon radical which is most preferably $C_{(1-8)}$ alkyl radical. The diorganopolysiloxane polymer may have from 10 to 500 parts per million of water or silanol groups in it as a result of the process by which it is made. Basically such linear diorganopolysiloxane polymers are made by taking diorganodichlorosilanes and hydrolyzing them in the presence of the appropriate triorganosiloxy chainstoppers. The resulting low molecular weight linear polysiloxane polymer is then taken and separated by decantation and further purified by distillation to yield the desired polymer. This appears to be the cheapest way to make such polymers and as a result they will contain some silanol groups in them. Generally, such silanol does not detract from the properties of the final composition.

Most preferably the plasticizer is a trimethylsiloxy end-stopped dimethylpolysiloxane linear polymer of a viscosity varying from 10 to 1000 centipoise at 25° C. If it is desired to lower the modulus of the composition further and also in some respects to increase the self-bonding properties of the composition, there may be incorporated into the base composition per 100 parts of the base silanol polymer from 0.2 to 10 parts by weight of a silanol-containing linear diorganopolysiloxane polymer with a viscosity in the range of 10 to 1000 centipoise at 25° C. where the organo group is a $C_{(1-8)}$ monovalent hydrocarbon radical and is more preferably a $C_{(1-8)}$ alkyl radical and the silanol content varies from 3 to 10% by weight and more preferably varies from 6 to 8% per weight. Preferably, the organo group is a methyl group and the polymer is dimethylsilanol terminated polymer of low molecular weight and low viscosity. Such a polymer is produced by taking diorganodichlorosilanes and hydrolyzing them in water so as to produce the desired low molecular weight silanol terminated polymer. When incorporated in the present composition along with the other ingredients, the silanol polymer will tend to decrease the modulus of the composition as well as enhance its self-bonding properties.

There may be added various other types of ingredients in the composition such as self-bonding additives, flame retardant additives, and other types of additives which are normal and common to such composition depending on the end use or end properties desired in the silicone elastomer that is formed. At any rate, in formulating composition, the ingredients are mixed substantially in an anhydrous state and packaged in a single package and stored as such. When it is desired to cure the composition, the seal on the package is broken, the composition is applied in whatever manner desired, and will cure upon exposure to atmospheric moisture to silicone elastomer with final cure taking place within 24 to 72 hours. It should be noted that such 24 to 72 hours is the case where there is present a curing promoter and preferably a tin salt of a carboxylic acid. Also, a distinction should be made between cure rate and shelf-life stabilization. Cure rate is the rate at which the composition cures which in the present case is fairly rapid. However, shelf life stabilization refers to the fact that after the composition is stored for a period of a year or more, it will cure at a fast rate but will not completely cure unless appropriate shelf-life stabilizers are present in the instant low modulus composition. Accordingly, even though the curing rate of the composition may be rapid after a year or more, the instant low or the preferred low modulus composition of the instant case may not cure completely or over a prolonged period of time which denotes a lack of shelf stability. This shelf stability can be improved by the incorporation in the composition of the foregoing shelf-life stabilizers.

Accordingly, with the above in mind, it is now necessary to discuss another aspect of the instant compositions, that is when the first silyl ether compositions or polymers were made, they cured very rapidly to a silicone elastomer. Accordingly, it was desirable to modify the composition or the crosslinking agent in the composition such that cure was not so rapid, that is that there was sufficient work life in the composition such that the composition could be used before it had set up. Accordingly, to accomplish this, alkoxy groups were incorporated in the silyl ether crosslinking agent of Formula (3) which was utilized in the composition to produce the cross-linking function in the formation of the silicone elastomer.

Accordingly, it was highly desirable to modify the crosslinking agent in some way so that the composition would have a sufficient work life. To accomplish this an alkoxy group was incorporated in the formula or the molecular makeup of the crosslinking agent as shown in Formula (7) above. However, it should be noted that the instant invention is broader than this in that there can be incorporated the self-bonding additive in any dimedone RTV composition as will be explained below.

Accordingly, in a broader sense there is encompassed by the present invention, a self-bonding one-component RTV silicone rubber composition comprising (A) 100 parts by weight of an organopolysiloxane consisting essentially of chemically combined units of the formula

(8)

and having terminal siloxy units of the formula,

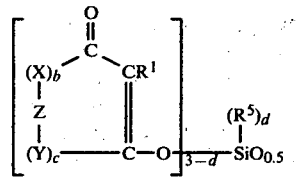

where R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, $R^5$ is a $C_{(1-13)}$ monovalent organic radical and d is a whole number having a value of 0 or 1, and (B) from 0.1 to 5 parts by weight of an adhesion promoter of the formula

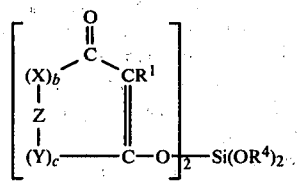

when X, Y, Z, $R^1$, b, c are as previously defined and $R^4$ is a $C_{(4-8)}$ monovalent hydrocarbon radical.

As noted the self-bonding additive in this instant case is the same as that which was disclosed in the previous dimedone functional RTV. However, the base organopolysiloxane is somewhat different in that it contains no alkoxy groups. While such a base polymer forms a desirable RTV silicone elastomer, it has the disadvantage that its cure rate is too high and there is not present a sufficient work life in the composition. It should be noted that in the foregoing Formulas (8) and (9) of the base organopolysiloxane, the different symbols have the same meaning as previously given except for $R^5$ which is a new group. The group $R^5$ can be any of $C_{(1-13)}$ monovalent organic radicals previously given for R and $R^1$. However, as noted previously, this more basic dimedone functional RTV polymer has the advantage that it has too rapid a cure rate. Accordingly, in order to slow up the cure rate so as to give the composition a desirable work life, the $R^5$ radical is preferably a $C_{(4-12)}$ radical such as butyl, pentyl, etc. If the $R^5$ radical is so substituted, the composition will have a desirable cure rate so as to give uncured composition or uncured RTV polymer sufficient work life. For more information as to such composition, one is referred to U.S. Pat. No. 4,176,111 which is hereby incorporated by reference.

It should be noted that the foregoing base polymer may also be described in terms of its ingredients. Accordingly, there is encompassed within the present invention a self-bonding one-component RTV silicone rubber composition comprising (A) 100 parts by weight of a silanol end-stopped polymer of the formula

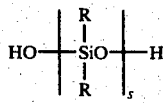

where R is a $C_{(1-18)}$ monovalent hydrocarbon radical and s varies such that the viscosity of the polymer varies from 100 to 1,000,000 centipoise at 25° C.; (B) from 0.1 to 10 parts by weight of a silyl ether crosslinking agent of the formula

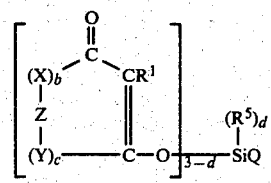

where Q is a hydrolyzable radical, R is a $C_{(1-13)}$ monovalent radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 0.1 to 5 parts by weight of an adhesion promoter of the formula

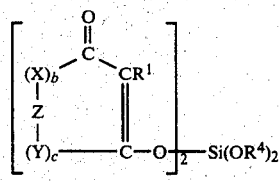

where X, Y, Z, $R^1$, d are as previously defined and $R^4$ is a $C_{(4-8)}$ monovalent hydrocarbon radical. Again the self-bonding additive is the same as previously defined, but the base polymer is described in terms of a silanol end-stopped polymer being reacted with the foregoing silyl ether of Formula (11). It should be noted that Q in the crosslinking agent (Formula 11) can be any hydrolyzable group including the silyl ether group taken 3-d times. This is also true of the crosslinking agent of Formula (7).

In such a mixture, it is hypothesized that most of the polymer is the foregoing base polymer of the diorganosiloxy units and the silyl ether terminal units of Formula (8) and (9). However, it should be noted that it is also hypothesized that other types of polymers are formed in such a mixture especially if there is present in the composition a curing promoter and the other ingredients that were mentioned previously with respect to the previous dimedone functional RTV system. It should be noted all the various ingredients that could be present in the alkoxy-functional silyl ether RTV composition can be present at the same concentrations in this latter dimedone functional RTV systems irrespective that $R^5$ is $C_{(1-13)}$ monovalent hydrocarbon radical or is $C_{(4-12)}$ monovalent hydrocarbon radical.

These ingredients and other ingredients can be used interchangeably in the two compositions unless they deleteriously affect some of the cure properties of the composition or are undesirable for one reason or another.

Another ingredient that may be utilized is a sag control agent. Accordingly, there may be from 0.01 to 3 parts by weight of a polyether as a sag control agent. Examples of suitable polyethers are the UCON brand name of polyethers sold by Union Carbide Corporation, New York.

The worker skilled in the art should know that the foregoing dimedone systems were given as examples of the most prevalent ones with which the adhesion promoter of the instant case can be utilized therewith. As far as is known or is hypothesized, the instant adhesion promoter can be utilized with all dimedone functional RTV one-component systems and will improve the self-bonding properties of such systems to various metallic substrates and desirably to other types of substrates such as wood, plastics, and glass. For further information as to the methods of producing such dimedone functional crosslinking agents, one is referred to the foregoing patents described above. Such information was not included here since it was felt it would be repetitive. Examples are given below for the purpose of illustrating the present invention. They are not given for any purpose of setting limits or bond as to the instant invention. All parts are by weight.

EXAMPLE 1

Preparation of di t-butoxy-bis-dimedonylsilane

A dry 5 liter flask equipped with an overhead stirrer, reflux condenser with nitrogen inlet and an addition funnel was charged with dimedone (5,5-dimethyl cyclohexane-1,3-dione) 112 parts (0.8 mole) and triethylamine 171.7 parts (1.70 mole) in 3600 ml of dry toluene. To this solution was added silicon tetrachloride 68 parts (0.4 mole) followed by t-butylalcohol 65 parts (0.88 mole). The reaction mixture was heated to 50° C. then allowed to cool to room temperature. The cooled mixture was filtered and the filtrate was concentrated in a stream of dry nitrogen. The oily residue was filtered to yield 155 parts (86%) of the desired product as a viscous oil. The NMR spectrum of this compound was consistent with its structure.

EXAMPLE 2

The above experiment was repeated except that dineopentoxydichlorosilane was first prepared then treated with dimedone and triethylamine as in the above example. The product was obtained as an oil containing 243 ppm ionic chloride. The dimedone content was determined titrimetrically to be 56.7% (theory 57.9%). The NMR spectrum was consistent with the assigned structure.

To a 500 ml flask equipped with a stirrer condenser and dropping funnel was added 96.6 g (0.57 mole) of silicon tetrachloride. From the dropping funnel was added a mixture of 100 g (1.14 mole) of neopentyl alcohol and 30 ml of hexane. The solution was added dropwise over one hour with vigorous evaluation of HCl. At the end of the addition, the reaction mixture was stirred for two hours followed by fractional distillation to give a fraction boiling at 215° C. This material was the desired product dineopentoxydichlorosilane.

To a drier 1000 ml flask was added 500 ml of dry toluene, 22.2 g (0.22 mole) of triethylamine and 28.0 g (0.20 mole) of dimedone. To this mixture, 27.3 g (0.10 mole) of the above-prepared chlorosilane was added dropwise while at room temperature. At the end of the addition, the mixture was filtered in a dry-box, the toluene and excess triethylamine removed by distillation and the yellow residue was filtered and analyzed. The yield obtained was 48 grams. Analysis of the material for % dimedone showed 56.73% (theory 57.92%).

EXAMPLE 3

A curable composition was prepared by mixing 100 parts by weight of a 10,000 cps silanol terminated dimethylpolysiloxane, 20 parts by weight of tetramer treated fumed silica, 1 part by weight of a low molecular weight silanol terminated dimethylpolysiloxane fluid containing 6-8% silanol groups and having a viscosity of 40 centipoise at 25° C. and 10 parts by weight of trimethylsiloxy end-stopped dimethylpolysiloxane fluid having 100 centipoise viscosity at 25° C. This base was heated to 90° C. for one hour under vacuum (<25 mm) while mixing. To this base mixture, there was added under anhydrous conditions 8 parts by weight of a catalyst mixture consisting of 80 parts by weight of methyl tris-dimedonylsilane, 20 parts by weight of di t-butoxy bis-dimedonylsilane, and one part by weight of dibutyl tin dilaurate. When this composition was exposed to atmospheric moisture a skin formed on the surface after one minute; a full cure was obtained in one hour. This material exhibited excellent adhesion to glass, 304 stainless steel and Alclad aluminum. There was more than 80% cohesive failure in attempting to remove the cured material from the substrate. The same formulation prepared without di t-butoxy bis-dimedonylsilane did not adhere to Alclad aluminum or 304 stainless steel.

EXAMPLE 4

A base mixture was prepared as having in it as follows:

A curable composition was prepared by mixing 100 parts by weight of a 120,000 centipoise silanol terminated dimethylpolysiloxane, 18.5 parts by weight of other methylcyclopolysiloxane treated fumed silica, 8 parts by weight of a trifunctional fluid comprising 4 mole % trimethylsiloxy units, 56 mole % dimethylsiloxy units and 40 mole % methylsiloxy units having 0.5 weight % silanol content of a 100 centipoise viscosity at 25° C., 25 parts by weight of a trimethysiloxy end-stopped dimethylpolysiloxane fluid, and 0.2 parts by weight of a polyether. The polyether is sold by Union Carbide Corporation under the commercial trade name UCON LB-1145. The above materials were mixed at ambient temperature under vacuum (<25 mm).

To 100 parts by weight of the above base mixture there was added 7 parts by weight of a catalyst mixture containing 80 parts of methyl tris-dimedonylsilane, 20 parts by weight of di t-butoxy bis-dimedonylsilane, 0.525 parts of dimethyl tin neodecanoate and 0.120 parts of zirconium octoate (12% zirconium metal content). The composition was exposed to atmospheric moisture whereupon it cured to an elastomer having the following physical properties:

| | |
|---|---|
| Shore A Hardness | 19 |
| Tensile psi | 218 |
| Elongation | 918% |

The adhesion of this elastomer to a variety of substrates was measured with the following results:

| Substrate | Peel Strength (lb/in) | % Cohesive Failure |
|---|---|---|
| Alclad Aluminum | 60 | 100% |
| 304 Stainless Steel | 45 | 5% |
| Acrylic | 67 | 100% |

What is claimed is:
1. A self-bonding one-component RTV silicone rubber composition comprising (A) 100 parts by weight of an organopolysiloxane consisting essentially of chemically combined units of the formula,

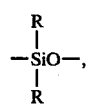

and having terminal alkoxysiloxy units of the formula,

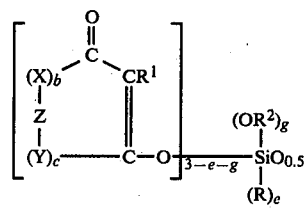

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; (B) from 0.1 to 5 parts by weight of an adhesion promoter of the formula,

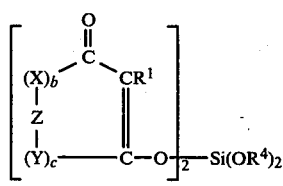

where X, Y, Z, $R^1$, b and c are as previously defined and $R^4$ is a $C_{(4-8)}$ monovalent hydrocarbon radical.
2. The composition of claim 1 wherein there is further present from 0.01 to 10 parts by weight of a curing promoter which is metal salt of a carboxylic acid and $R^4$ is tertiary butyl.

3. The composition of claim 2 wherein the curing promoter is a tin salt.

4. The composition of claim 3 wherein the tin salt is dimethyl tin bis-neodecanoate.

5. The composition of claim 4 wherein there is present from 0.1 to 5 parts by weight of shelf life stabilizer.

6. The composition of claim 5 wherein the shelf life stabilizer is zirconium octoate.

7. The composition of claim 6 wherein there is present from 10 to 200 parts by weight of a filler.

8. The composition of claim 7 wherein the filler is fumed silica treated with cyclopolysiloxanes.

9. The composition of claim 8 wherein there is further present from 1 to 50 parts by weight of a plasticizer which is a linear diorganopolysiloxane polymer of a viscosity varying from 10 to 2,000 centipoise at 25° C. and the organo group is a $C_{(1-8)}$ monovalent hydrocarbon radical.

10. The composition of claim 9 wherein there is further present from 0.2 to 10 parts by weight of a plasticizer and adhesion promoter which is silanol containing diorganopolysiloxane with a viscosity in the range of 10 to 1000 centipoise at 25° C. where the organo group is a $C_{(1-8)}$ monovalent hydrocarbon radical and the silanol content varies from 3 to 10% by weight.

11. A self-bonding one-component RTV silicone rubber composition comprising (A) 100 parts by weight of a silanol end-stopped polymer of the formula,

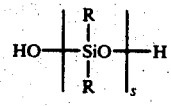

where s varies such that the viscosity of the polymer varies from 100 to 1,000,000 centipoise at 25° C.; (B) from 0.1 to 10 parts by weight of a silyl ether cross-linking agent of the formula,

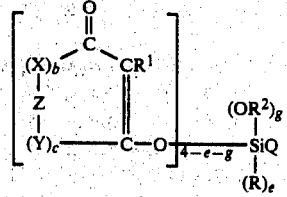

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 0.1 to 5 parts by weight of an adhesion promoter of the formula,

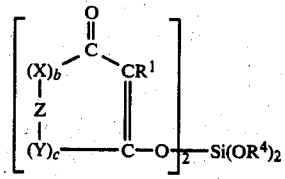

where X, Y, Z, $R^1$, b, c are as previously defined and $R^4$ is a $C_{(4-8)}$ monovalent hydrocarbon radical.

12. The composition of claim 11 where there is further present from 0.01 to 10 parts by weight of a curing promoter which is a metal salt of a carboxylic acid and $R^4$ is tertiary butyl.

13. The composition of claim 12 wherein the curing promoter is a tin salt.

14. The composition of claim 13 wherein the tin salt is a dimethyl tin bis-neodecanoate.

15. The composition of claim 14 where there is present from 0.1 to 5 parts by weight of a shelf life stabilizer.

16. The composition of claim 15 wherein the shelf life stabilizer is zirconium octoate.

17. The composition of claim 15 wherein the filler is fumed silica treated with cyclopolysiloxanes.

18. The composition of claim 17 wherein the filler is fumed silica treated with cyclopolysiloxanes.

19. The composition of claim 18 where there is further present from 1 to 50 parts by weight of a plasticizer which is a linear diorganopolysiloxane polymer of a viscosity varying from 10 to 1,000 centipoise at 25° C. and the organo group is a $C_{(1-8)}$ monovalent hydrocarbon radical.

20. The composition of claim 19 wherein there is further present from 0.2 to 10 parts by weight of a plasticizer and an adhesion promoter which is silanol containing diorganopolysiloxane with a viscosity in the range of 10 to 1,000 centipoise at 25° C. where the organo group is a $C_{(1-8)}$ monovalent hydrocarbon radical and the silanol content varies from 3 to 10% by weight.

21. A self-bonding one-component RTV silicone rubber composition comprising (A) 100 parts by weight of an organopolysiloxane consisting essentially of chemically combined units of the formula,

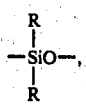

and having terminal siloxy units of the formula,

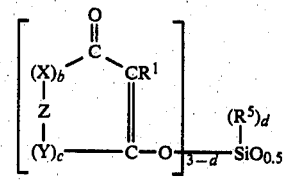

where R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R and d is a whole number having a value of 0 or 1, $R^5$ is a $C_{(1-13)}$ monovalent organic radical, and (B) from 0.1 to 5 parts by weight an adhesion promoter of the formula,

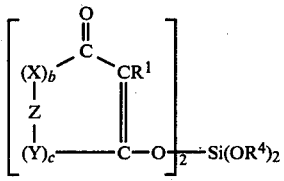

where X, Y, Z, $R^1$, b, c are as previously defined and $R^4$ is a $C_{(4-8)}$ monovalent hydrocarbon radical.

22. The composition of claim 21 wherein in the base organopolysiloxane $R^5$ is a $C_{(4-12)}$ alkyl radical.

23. The composition of claim 22 wherein $R^5$ is a dodecyl radical.

24. The composition of claim 23 wherein there is further present from 0.01 to 10 parts by weight of a curing promoter which is a metal salt of a carboxylic acid and $R^4$ in the adhesion promoter is tertiary butyl.

25. The composition of claim 24 wherein the curing promoter is a tin salt.

26. The composition of claim 25 wherein the tin salt is dimethyl tin bis-neodecanoate.

27. The composition of claim 26 wherein there is present from 0.1 to 5 parts by weight of a shelf-life stabilizer.

28. The composition of claim 27 wherein the shelf-life stabilizer is zirconium octoate.

29. The composition of claim 27 wherein there is further present from 10 to 200 parts by weight of a filler.

30. The composition of claim 29 wherein this filler is fumed silica treated with cyclopolysiloxanes.

31. The composition of claim 30 wherein there is further present from 1 to 50 parts by weight of a plasticizer which is a linear diorganopolysiloxane of a viscosity varying from 10 to 1,000 centipoise at 25° C. and the organo group is a $C_{(1-8)}$ monovalent hydrocarbon radical.

32. The composition of claim 31 wherein there is further present from 0.2 to 10 parts by weight of a plasticizer and an adhesion promoter which is silanol containing diorganopolysiloxane with a viscosity in the range of 10 to 1000 centipoise at 25° C. wherein the organo group is a $C_{(1-8)}$ monovalent hydrocarbon radical and the silanol content varies from 3 to 10% by weight.

33. A self-bonding one-component RTV silicone rubber composition comprising (A) 100 parts by weight of a silanol end-stopped polymer of the formula,

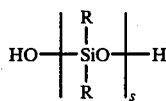

where s varies such that the viscosity of the polymer varies from 100 to 1,000,000 centipoise at 25° C.; (B) from 0.1 to 10 parts by weight of a silyl ether cross-linking agent of the formula,

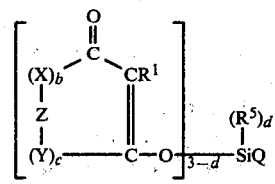

where Q is a hydrolyzable radical, R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 0.1 to 5 parts by weight of an adhesion promoter of the formula,

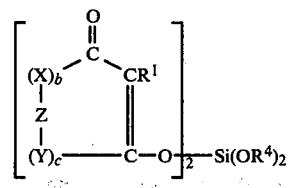

where X, Y, Z, $R^1$, c are previously defined and $R^4$ is a $C_{(4-8)}$ monovalent hydrocarbon radical.

34. The composition of claim 33 wherein the silyl ether cross-linking agent $R^5$ is a $C_{(4-12)}$ alkyl radical.

35. The composition of claim 34 wherein $R^5$ is a dodecyl radical.

36. The composition of claim 35 where there is further present from 0.01 to 10 parts by weight of a curing promoter which is a metal salt of a carboxylic acid and $R^4$ in the adhesion promoter is tertiary butyl.

37. The composition of claim 36 wherein the curing promoter is a tin salt.

38. The composition of claim 37 wherein the tin salt is dimethyl tin bis-neodecanoate.

39. The composition of claim 38 wherein there is further present from 0.1 to 5 parts by weight of a shelf-life stabilizer.

40. The composition of claim 39 wherein the shelf-life stabilizer is zirconium octoate.

41. The composition of claim 39 wherein there is further present from 10 to 200 parts by weight of a filler.

42. The composition of claim 41 wherein the filler is fumed silica treated with cyclopolysiloxanes.

43. The composition of claim 42 wherein there is further present from 1 to 50 parts by weight of a plasticizer which is a linear diorganopolysiloxane polymer of a viscosity varying from 10 to 1,000 centipoise at 25° C. and the organo group is a $C_{(1-8)}$ monovalent hydrocarbon radical.

44. The composition of claim 43 wherein there is further present from 0.2 to 10 parts by weight of a plasticizer and an additional adhesion promoter which is silanol containing diorganopolysiloxane with a viscosity in the range of 10 to 1,000 centipoise at 25° C. where the organo group is a $C_{(1-8)}$ monovalent hydrocarbon radical and the silanol content varies from 3 to 10% by weight.

45. A process for forming a self-bonding one-component RTV silicone rubber composition comprising (1) mixing (A) 100 parts by weight of a silanol end-stopped polymer of the formula,

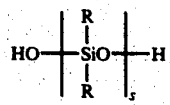

where s varies such that the viscosity of the polymer varies from 100 to 1,000,000 centipoise at 25° C. (B) from 0.1 to 10 parts by weight of silyl ether crosslinking agent of the formula,

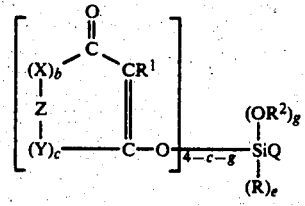

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

S is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; and (C) from 0.1 to 5 parts by weight of an adhesion promoter of the formula,

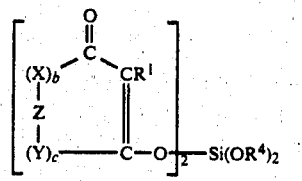

where X, Y, Z, $R^1$, b, c are as previously defined and $R^4$ is a $C_{(4-8)}$ monovalent hydrocarbon radical; (2) allowing the composition to cure at room temperature 46. A process for forming self-bonding one-component RTV silicone rubber compositions comprising (1) mixing (A) 100 parts by weight of a silanol end-stopped polymer of the formula,

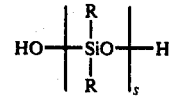

where s varies such that the viscosity of the polymer varies from 100 to 1,000,000 centipoise at 25° C.; (B) from 0.1 to 10 parts by weight of a silyl ether crosslinking agent of the formula,

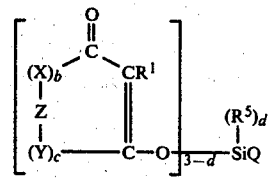

where Q is a hydrolyzable radical, R is a $C_{(1-13)}$ monovalent organic radical, $R^1$ is selected from hydrogen, halogen and R, X, and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 0.1 to 5 parts by weight of an adhesion promoter of the formula,

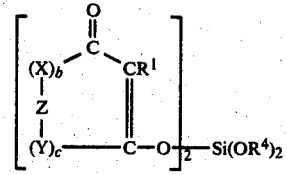

where X, Y, Z, $R^1$, c are previously defined and $R^4$ is a $C_{(4-8)}$ monovalent hydrocarbon radical; (2) allowing the composition to cure at room temperature to a silicone elastomer.

47. The process of claim 46 wherein in the silyl ether crosslinking agent $R^5$ is a $C_{(4-12)}$ alkyl radical.

48. The process of claim 47 wherein $R^5$ is a dodecyl radical.

49. An article of manufacture comprising a laminate of metallic substrate and a one-component self-bonding RTV silicone rubber composition comprising (1) a substrate selected from a metal, plastic or glass and (2) having thereover a layer of self-bonding one-component RTV silicone rubber composition having (A) 100 parts by weight of an organopolysiloxane consisting essentially of chemically combined units of the formula,

and having terminal alkoxysiloxy units of the formula,

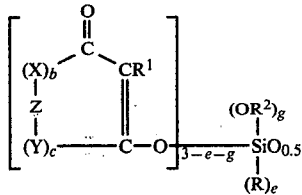

where R is a $C_{(1-13)}$ monovalent organic radical, $R^1$ is selected from hydrogen, halogen and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 or 1, g is equal to 1 or 2, and the sum of e+g is equal to 1 or 2; (B) from 0.1 to 5 parts by weight of an adhesion promoter of the formula,

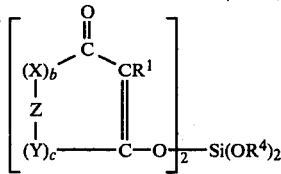

where X, Y, Z, $R^1$, b and c are as previously defined and $R^4$ is a $C_{(4-8)}$ monovalent hydrocarbon radical.

50. The laminate of claim 49 wherein it is further present from 0.01 to 10 parts by weight of a curing promoter which is a metal salt of a carboxylic acid and $R^4$ in the adhesion promoter is tertiary butyl.

51. A laminate of a substrate and a silicone rubber composition comprising (1) a substrate selected from metallic substrates, plastic substrates and glass substrates and (2) a layer over said substrate of a self-bonding one-component RTV silicone rubber composition having (A) 100 parts by weight of a silanol end-stopped polymer of the formula,

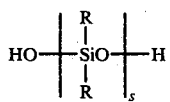

where s varies such that the viscosity of the polymer varies from 100 to 1,000,000 centipoise at 25° C.; (B) from 0.1 to 10 parts by weight of a silyl ether crosslinking agent of the formula,

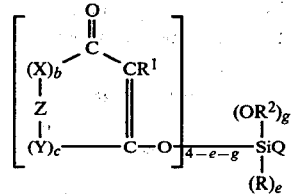

where Q is a hydrolyzable radical, R is a $C_{(1-13)}$ monovalent organic radical, $R^1$ is selected from hydrogen, halogen, and R, $R^2$ is a $C_{(1-8)}$ alkyl radical, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, e is a whole number having a value of 0 to 1, g is equal to 1 or 2, and the sum of e+g is equal to 1 or 2; and (C) from 0.1 to 5 parts by weight of an adhesion promoter of the formula,

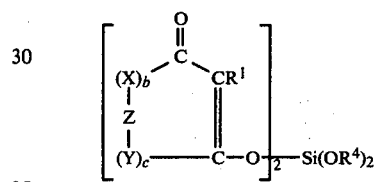

where X, Y, Z, $R^1$, b, c are as previously defined and $R^4$ is a $C_{(4-8)}$ monovalent hydrocarbon radical.

52. The laminate of claim 51 where it is further present from 0.01 to 10 parts by weight of a curing promoter which is a metal salt of a carboxylic acid and $R^4$ is tertiary butyl.

53. A laminate of a substrate and a silicone elastomer comprising (1) a substrate selected from metallic substrates, plastic substrates, glass substrates and (2) applied over the substrate a layer of self-bonding one-component RTV silicone rubber composition having (A) 100 parts by weight of an organopolysiloxane consisting essentially of chemically combined units of the formula,

and having terminal siloxy units of the formula,

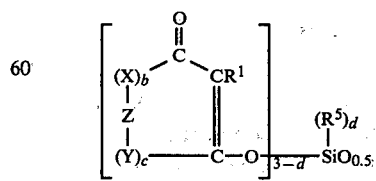

where R is a $C_{(1-13)}$ monovalent organic radical, $R^1$ is selected from hydrogen, halogen and R, X, and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical, and (B) from 0.1 to 5 parts by weight of an adhesion promoter of the formula

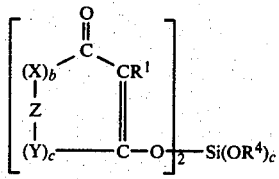

where X, Y, Z, $R^1$, b, c are as previously defined and $R^4$ is a $C_{(4-8)}$ monovalent hydrocarbon radical.

54. The composition of claim 53 wherein the base organopolysiloxane $R^5$ is a $C_{(4-12)}$ alkyl radical.

55. The laminate of claim 55 wherein there is further present from 0.01 to 10 parts by weight of a curing promoter which is a metal salt of a carboxylic acid and $R^4$ in the adhesion promoter is tertiary butyl.

56. The laminate of claim 55 wherein there is further present from 0.01 to 10 parts by weight of a curing promoter which is a metal salt of a carboxylic acid and $R^4$ in the adhesion promoter is tertiary butyl.

57. A laminate of a substrate and a silicone elastomer comprising (1) a substrate selected from the class consisting of metallic substrates, plastic substrates and glass substrates and (2) applied over the substrate a layer of a self-bonding one-component RTV silicone rubber composition having (A) 100 parts by weight of a silanol end-stopped polymer of the formula,

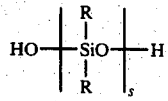

where s varies such that the viscosity of the polymer varies from 100 to 1,000,000 centipoise at 25° C.; (B) from 0.1 to 10 parts by weight of a silyl ether crosslinking agent of the formula,

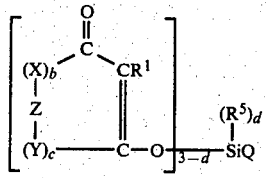

where Q is a hydrolyzable radical, R is a $C_{(1-13)}$ monovalent organic radical, $R^1$ is selected from hydrogen, halogen and R, X and Y are divalent radicals selected from —O—, —S— and

Z is a divalent $C_{(1-13)}$ organic radical selected from alkylene, cycloalkylene, arylene and a fused ring structure, b and c are equal to 0 or 1, $R^3$ is selected from hydrogen and R, and d is a whole number having a value of 0 or 1, $R^5$ is a $C_{(1-13)}$ monovalent organic radical; and (C) from 0.1 to 5 parts by weight of an adhesion promoter of the formula,

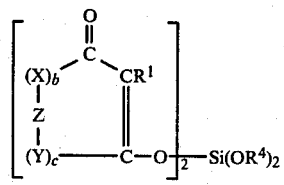

where X, Y, Z, $R^1$, c are previously defined and $R^4$ is a $C_{(4-8)}$ monovalent hydrocarbon radical.

58. The laminate of claim 57 wherein in the silyl ether crosslinking agent $R^5$ is a $C_{(4-12)}$ alkyl radical.

59. The laminate of claim 58 where $R^5$ is a dodecyl radical.

60. The laminate of claim 59 wherein there is further present from 0.01 to 10 parts by weight of a curing promoter which is a metal salt of a carboxylic acid and $R^4$ in the adhesion promoter is tertiary butyl.

61. The composition of claim 1 where there is further present from 2 to 20 parts by weight of a fluid polysiloxane containing a high degree of trifunctionality, tetrafunctionality and comprising
   (i) from 25 to 60 mole percent of monoalkylsiloxy units, siloxy units, or a mixture of such units;
   (ii) from 1 to 6 mole percent of trialkylsiloxy units; and
   (iii) from 34 to 74 mole percent of dialkylsiloxy units, said polysiloxane containing from about 0.1 to about 2% by weight of silicon-bonded hydroxyl groups.

62. The composition of claim 11 where there is further present from 2 to 20 parts by weight of a fluid polysiloxane containing a high degree of trifunctionality, tetrafunctionality and comprising
   (i) from 25 to 60 mole percent of monoalkylsiloxy units, siloxy units, or a mixture of such units;
   (ii) from 1 to 6 mole percent of trialkylsiloxy units; and
   (iii) from 34 to 74 mole percent of dialkylsiloxy units, said polysiloxane containing from about 0.1 to about 2% by weight of silicon-bonded hydroxyl groups.

63. The composition of claim 21 where there is further present from 2 to 20 parts by weight of a fluid polysiloxane containing a high degree of trifunctionality, tetrafunctionality and comprising
   (i) from 25 to 60 mole percent of monoalkylsiloxy units, siloxy units, or a mixture of such units;
   (ii) from 1 to 6 mole percent of trialkylsiloxy units; and
   (iii) from 34 to 74 mole percent of dialkylsiloxy units, said polysiloxane containing from about 0.1 to about 2% by weight of silicon-bonded hydroxyl groups.

64. The composition of claim 33 where there is further present from 2 to 20 parts by weight of a fluid polysiloxane containing a high degree of trifunctionality, tetrafunctionality and comprising
   (i) from 25 to 60 mole percent of monoalkylsiloxy units, siloxy units, or a mixture of such units;
   (ii) from 1 to 6 mole percent of trialkylsiloxy units; and
   (iii) from 34 to 74 mole percent of dialkylsiloxy units, said polysiloxane containing from about 0.1 to about 2% by weight of silicon-bonded hydroxyl groups.

* * * * *